(12) United States Patent
Siddiqui et al.

(10) Patent No.: US 10,923,837 B2
(45) Date of Patent: Feb. 16, 2021

(54) TERMINAL BLOCK WITH SEALING TERMINAL LUG

(71) Applicant: Ford Global Technologies, LLC, Dearborn, MI (US)

(72) Inventors: Siraj Siddiqui, Lasalle (CA); Casey Taylor Dunn, Brownstown Charter Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/431,123

(22) Filed: Jun. 4, 2019

(65) Prior Publication Data

US 2020/0388941 A1    Dec. 10, 2020

(51) Int. Cl.
| | |
|---|---|
| *H01R 9/22* | (2006.01) |
| *H01R 9/24* | (2006.01) |
| *H02K 5/22* | (2006.01) |
| *B60K 6/365* | (2007.10) |
| *H02K 7/00* | (2006.01) |
| *B60L 53/16* | (2019.01) |

(52) U.S. Cl.
CPC ............... *H01R 9/223* (2013.01); *H01R 9/24* (2013.01); *H02K 5/225* (2013.01); *H02K 7/006* (2013.01); *B60K 6/365* (2013.01); *B60L 53/16* (2019.02); *B60Y 2200/92* (2013.01); *H01R 2201/26* (2013.01)

(58) Field of Classification Search
CPC .......... H02K 5/225; H02K 7/006; H02K 5/10; B60Y 2200/92; B60K 6/35; H01R 2201/26; H01R 9/24; H01R 9/2675
See application file for complete search history.

(56) References Cited

U.S. PATENT DOCUMENTS

| | | | | |
|---|---|---|---|---|
| 6,702,612 B2* | 3/2004 | Miyazaki | ............. | H01R 13/521 439/559 |
| 6,746,258 B2* | 6/2004 | Kikuchi | ............... | H01R 13/635 217/1 |
| 7,909,663 B1* | 3/2011 | Bouffet | ................ | H01R 25/142 439/787 |
| 7,955,097 B2* | 6/2011 | O'Leary | ............. | H01R 13/506 439/114 |
| 8,388,364 B2* | 3/2013 | Kikuchi | ............... | H01R 13/428 439/251 |

(Continued)

FOREIGN PATENT DOCUMENTS

DE    102016207547 A1    11/2017

*Primary Examiner* — Briggitte R Hammond
(74) *Attorney, Agent, or Firm* — David B. Kelley; Brooks Kushman P.C.

(57) ABSTRACT

A terminal block includes a housing having sidewalls defining a cavity. One of the sidewalls defines a hole opening into the cavity. A conductor is supported in the cavity and is configured to electrically connect with an inverter. A terminal lug extends through the hole. The terminal lug includes a body having a first end disposed in the cavity and attached to the conductor and a second end external to the cavity and configured to attach to a terminal lead of an electric machine. The terminal lug further includes a support integrally formed with the body and disposed between the first and second ends to be located within the hole. A sealing member is attached to the support and is in sealing engagement with the hole to prevent fluid from entering the cavity.

19 Claims, 3 Drawing Sheets

(56) References Cited

U.S. PATENT DOCUMENTS

| | | | | |
|---|---|---|---|---|
| 8,446,058 B2* | 5/2013 | Avula | H01R 9/226 | 310/71 |
| 8,779,641 B2* | 7/2014 | Fujii | H02K 29/08 | 310/71 |
| 2003/0040215 A1* | 2/2003 | Kleen | H01R 11/01 | 439/510 |
| 2004/0235364 A1* | 11/2004 | Matsumoto | B60L 50/72 | 439/752 |
| 2006/0068617 A1* | 3/2006 | Migita | H02K 3/522 | 439/76.2 |
| 2007/0105427 A1* | 5/2007 | Mori | H01R 11/03 | 439/364 |
| 2009/0093157 A1* | 4/2009 | Aoki | H01R 13/648 | 439/607.01 |
| 2009/0093159 A1* | 4/2009 | Aoki | H01R 9/032 | 439/607.41 |
| 2011/0316372 A1* | 12/2011 | Kobayashi | H02K 5/225 | 310/71 |
| 2012/0094537 A1* | 4/2012 | Aoki | H01R 13/688 | 439/620.26 |
| 2012/0094547 A1* | 4/2012 | Ando | H01R 43/24 | 439/736 |
| 2013/0078872 A1* | 3/2013 | Tashiro | H01R 13/4223 | 439/695 |
| 2013/0153292 A1* | 6/2013 | Adachi | H01B 7/009 | 174/70 R |
| 2013/0214593 A1* | 8/2013 | Ohashi | B60R 16/03 | 307/10.1 |
| 2013/0306344 A1* | 11/2013 | Toyama | H01B 7/0081 | 174/68.2 |
| 2014/0134869 A1* | 5/2014 | Hamai | H01R 13/62 | 439/345 |
| 2014/0148045 A1* | 5/2014 | Kashiwada | H01R 13/688 | 439/485 |
| 2016/0285335 A1* | 9/2016 | Watanabe | H02K 5/20 | |
| 2018/0304835 A1 | 10/2018 | Skalski | | |

* cited by examiner

TERMINAL BLOCK WITH SEALING TERMINAL LUG

TECHNICAL FIELD

This disclosure relates to high-voltage electrical systems for electrified vehicles and more specifically to terminal blocks that have a dry cavity sealed by sealing features of terminal lugs.

BACKGROUND

Vehicles such as battery-electric vehicles (BEVs), plug-in hybrid electric vehicles (PHEVs) and full hybrid-electric vehicles (FHEVs) contain a traction battery assembly to act as an energy source for one or more electric machines. The traction battery includes components and systems to assist in managing vehicle performance and operations. A power inverter is electrically connected between the battery and the electric machines to convert the direct current coming from the battery into alternating current compatible with the electric machines. The power inverter may also act as a rectifier to convert alternating current from the electric machines to direct current compatible with the battery.

SUMMARY

According to one embodiment, a terminal block includes a housing having sidewalls defining a cavity. One of the sidewalls defines a hole opening into the cavity. A conductor is supported in the cavity and is configured to electrically connect with an inverter. A terminal lug extends through the hole. The terminal lug includes a body having a first end disposed in the cavity and attached to the conductor and a second end external to the cavity and configured to attach to a terminal lead of an electric machine. The terminal lug further includes a support integrally formed with the body and disposed between the first and second ends to be located within the hole. A sealing member is attached to the support and is in sealing engagement with the hole to prevent fluid from entering the cavity.

According to another embodiment, a terminal block includes a housing defining a hole and a conductor supported in the housing and electrically connectable with an inverter. A terminal lug extends through the hole and has a first end attached to the conductor and a second end attachable to a terminal lead of an electric machine. A sealing member is attached to the terminal lug and is in sealing engagement with the hole to prevent fluid from entering the housing.

According to yet another embodiment, a terminal block includes a housing having walls defining a cavity. One of the walls defines a hole opening into the cavity. A conductor is supported in the cavity and is configured to electrically connect with an inverter. A terminal lug extends through the hole. The terminal lug includes a body having a first end disposed in the cavity and attached to the conductor, a second end external to the cavity and configured to attached to a terminal lead of an electric machine, and a notch defined in the body between the first and second ends. A sealing assembly has a support attached to the terminal lug at the notch and a sealing member seated on the support and in sealing engagement with the hole to prevent fluid from entering the cavity.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
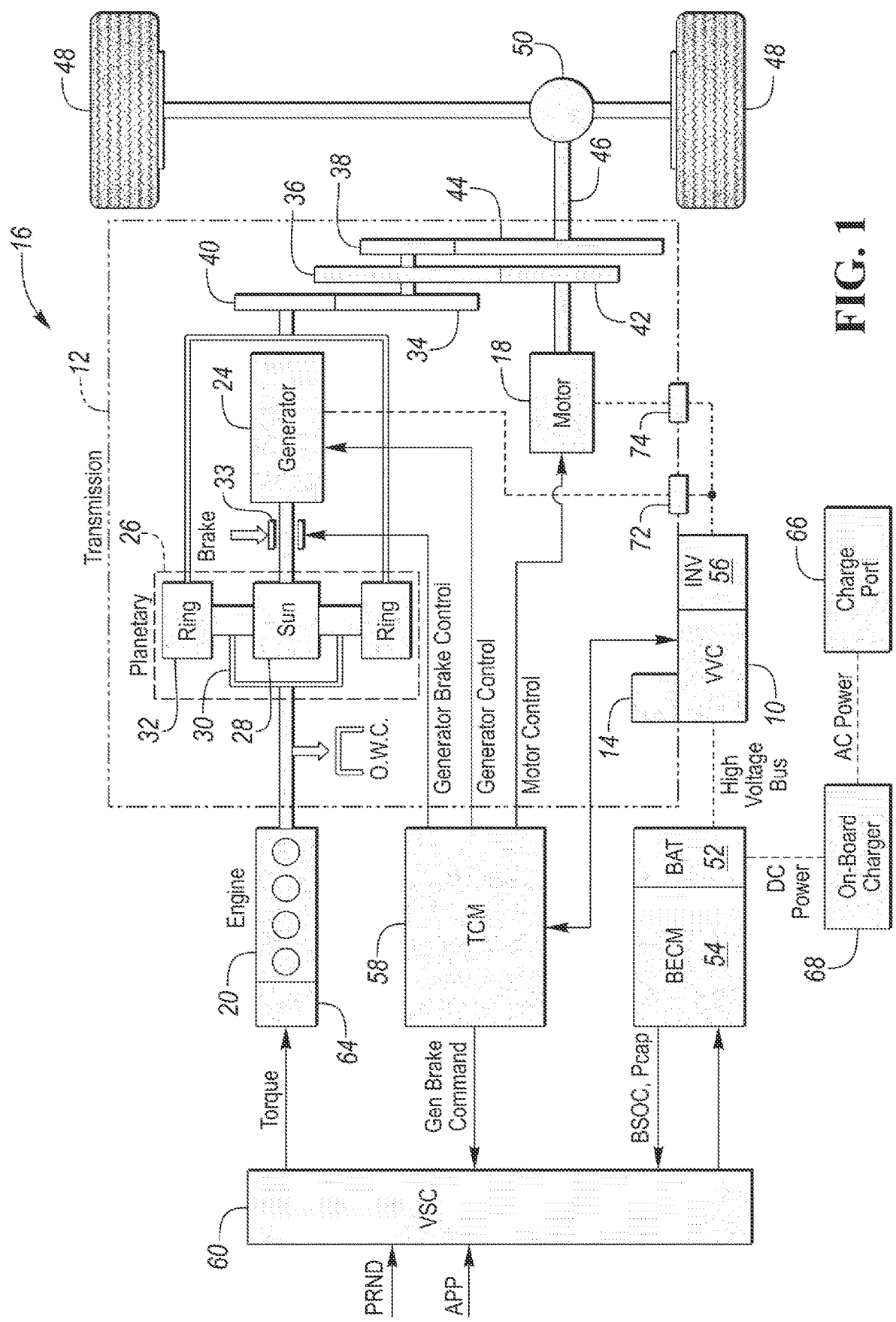
FIG. 1 is a schematic diagram of an example hybrid vehicle.

An example of a PHEV is depicted in FIG. 1 and referred to generally as a vehicle 16. The vehicle 16 includes a transmission 12 and is propelled by at least one electric machine 18 with assistance from an internal combustion engine 20. The electric machine 18 may be an AC electric motor depicted as "motor" 18 in FIG. 1. The electric machine 18 receives electrical power and provides torque for vehicle propulsion. The electric machine 18 also functions as a generator for converting mechanical power into electrical power through regenerative braking.

The transmission 12 may be a power-split configuration. The transmission 12 includes the first electric machine 18 and a second electric machine 24. The second electric machine 24 may be an AC electric motor depicted as "generator" 24 in FIG. 1. Like the first electric machine 18, the second electric machine 24 receives electrical power and provides output torque. The second electric machine 24 also functions as a generator for converting mechanical power into electrical power and optimizing power flow through the transmission 12. In other embodiments, the transmission does not have a power-split configuration.

The transmission 12 includes a planetary gear unit 26, which includes a sun gear 28, a planet carrier 30 and a ring gear 32. The sun gear 28 is connected to an output shaft of the second electric machine 24 for receiving generator torque. The planet carrier 30 is connected to an output shaft of the engine 20 for receiving engine torque. The planetary gear unit 26 combines the generator torque and the engine torque and provides a combined output torque about the ring gear 32. The planetary gear unit 26 functions as a continuously variable transmission, without any fixed or "step" ratios.

The transmission 12 may also include a one-way clutch (O.W.C.) and a generator brake 33. The O.W.C. is coupled to the output shaft of the engine 20 to only allow the output shaft to rotate in one direction. The O.W.C. prevents the transmission 12 from back-driving the engine 20. The generator brake 33 is coupled to the output shaft of the second electric machine 24. The generator brake 33 may be activated to "brake" or prevent rotation of the output shaft of the second electric machine 24 and of the sun gear 28. Alternatively, the O.W.C. and the generator brake 33 may be eliminated and replaced by control strategies for the engine 20 and the second electric machine 24.

The transmission 12 includes a countershaft having intermediate gears including a first gear 34, a second gear 36 and a third gear 38. A planetary output gear 40 is connected to the ring gear 32. The planetary output gear 40 meshes with the first gear 34 for transferring torque between the planetary gear unit 26 and the countershaft. An output gear 42 is connected to an output shaft of the first electric machine 18. The output gear 42 meshes with the second gear 36 for transferring torque between the first electric machine 18 and the countershaft. A transmission output gear 44 is connected to a driveshaft 46. The driveshaft 46 is coupled to a pair of driven wheels 48 through a differential 50. The transmission output gear 44 meshes with the third gear 38 for transferring torque between the transmission 12 and the driven wheels 48.

The vehicle 16 includes an energy storage device, such as a traction battery 52 for storing electrical energy. The battery 52 is a high voltage battery that is capable of outputting electrical power to operate the first electric machine 18 and the second electric machine 24. The battery 52 also receives electrical power from the first electric machine 18 and the second electric machine 24 when they are operating as generators. The battery 52 is a battery pack made up of several battery modules (not shown), where each battery module contains a plurality of battery cells (not shown). Other embodiments of the vehicle 16 contemplate different types of energy storage devices, such as capacitors and fuel cells (not shown) that supplement or replace the battery 52. A high voltage bus electrically connects the battery 52 to the first electric machine 18 and to the second electric machine 24.

The vehicle includes a battery energy control module (BECM) 54 for controlling the battery 52. The BECM 54 receives input that is indicative of vehicle conditions and battery conditions, such as battery temperature, voltage and current. The BECM 54 calculates and estimates battery parameters, such as battery state of charge and the battery power capability. The BECM 54 provides output (BSOC, $P_{cap}$) that is indicative of a battery state of charge (BSOC) and a battery power capability ($P_{cap}$) to other vehicle systems and controllers.

The vehicle 16 includes a DC-DC converter or variable voltage converter (VVC) 10 and an inverter 56. The VVC 10 and the inverter 56 are electrically connected between the traction battery 52 and the first electric machine 18, and between the battery 52 and the second electric machine 24. The VVC 10 "boosts" or increases the voltage potential of the electrical power provided by the battery 52. The VVC 10 also "bucks" or decreases the voltage potential of the electrical power provided to the battery 52, according to one or more embodiments. The inverter 56 inverts the DC power supplied by the main battery 52 (through the VVC 10) to AC power for operating the electric machines 18, 24. The inverter 56 also rectifies AC power provided by the electric machines 18, 24, to DC for charging the traction battery 52.

Other embodiments of the transmission 12 include multiple inverters (not shown), such as one invertor associated with each electric machine 18, 24. The VVC 10 includes an inductor assembly 14.

Terminal blocks 72 and 74 may be used to electrically connect the generator 24 and the motor 18 to the inverter 56. The motor 18 and the generator 24 are disposed within the transmission housing and thus operate in a wet environment (e.g., transmission fluid). The inverter 56 may be in a dry environment. The terminal blocks 72, 74 provide an interface between these wet and dry environments so that transmission fluid does not flow along the conductive paths into the inverter housing.

The transmission 12 includes a transmission control module (TCM) 58 for controlling the electric machines 18, 24, the VVC 10 and the inverter 56. The TCM 58 is configured to monitor, among other things, the position, speed, and power consumption of the electric machines 18, 24. The TCM 58 also monitors electrical parameters (e.g., voltage and current) at various locations within the VVC 10 and the inverter 56. The TCM 58 provides output signals corresponding to this information to other vehicle systems.

The vehicle 16 includes a vehicle system controller (VSC) 60 that communicates with other vehicle systems and controllers for coordinating their function. Although it is shown as a single controller, the VSC 60 may include multiple controllers that may be used to control multiple vehicle systems according to an overall vehicle control logic, or software.

The vehicle controllers, including the VSC 60 and the TCM 58 generally includes any number of microprocessors, ASICs, ICs, memory (e.g., FLASH, ROM, RAM, EPROM and/or EEPROM) and software code to co-act with one another to perform a series of operations. The controllers also include predetermined data, or "look up tables" that are based on calculations and test data and stored within the memory. The VSC 60 communicates with other vehicle systems and controllers (e.g., the BECM 54 and the TCM 58) over one or more wired or wireless vehicle connections using common bus protocols (e.g., CAN and LIN). The VSC 60 receives input (PRND) that represents a current position of the transmission 12 (e.g., park, reverse, neutral or drive). The VSC 60 also receives input (APP) that represents an accelerator pedal position. The VSC 60 provides output that represents a desired wheel torque, desired engine speed, and generator brake command to the TCM 58; and contactor control to the BECM 54.

The vehicle 16 includes an engine control module (ECM) 64 for controlling the engine 20. The VSC 60 provides output (desired engine torque) to the ECM 64 that is based on a number of input signals including APP, and corresponds to a driver's request for vehicle propulsion.

If the vehicle 16 is a PHEV, the battery 52 may periodically receive AC energy from an external power supply or grid, via a charge port 66. The vehicle 16 also includes an on-board charger 68, which receives the AC energy from the charge port 66. The charger 68 is an AC/DC converter which converts the received AC energy into DC energy suitable for charging the battery 52. In turn, the charger 68 supplies the DC energy to the battery 52 during recharging. Although illustrated and described in the context of a PHEV 16, it is understood that the terminal blocks 72, 74 may be implemented on other types of electrified vehicles that may have different architects than vehicle 16.

Figure 2:
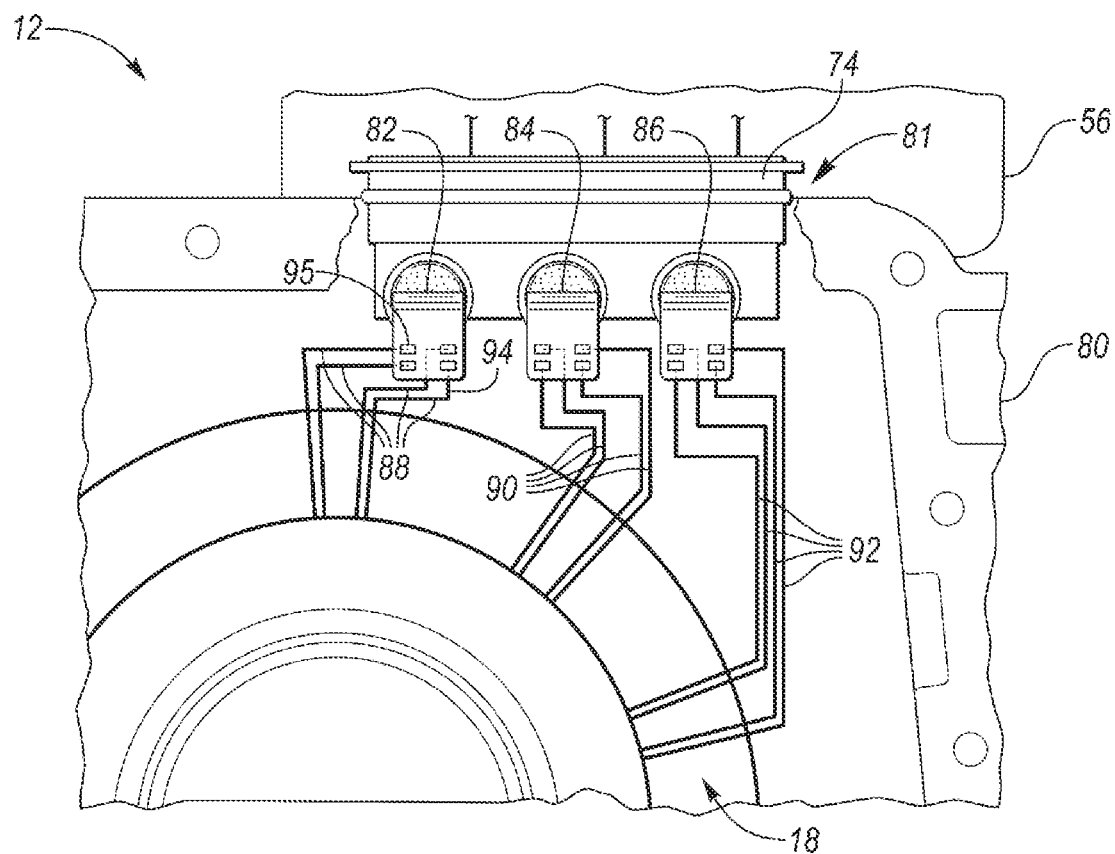
FIG. 2 is a schematic front view of a portion of a hybrid transmission.

Referring to FIG. 2, the transmission 12, according to one or more embodiments, includes a housing 80 that houses many of the above described components of the transmission 12. Shown in FIG. 2 is the motor 18 and the terminal block 74. The terminal block 74 serves to electrically connect the motor 18 to the inverter 56 and provide a wet/dry interface. The terminal block 74 is partially disposed within the transmission housing 80. For example, the housing 80 may define an opening 81 that receives a lower portion of the terminal block 74 therein. The illustrated electric machine 18 is a three-phase machine including three terminal leads 88, 90, and 92 each associated with one of the phases. The terminal block 74 includes three terminal lugs 82, 84, and 86 that are each associated with one of the terminal leads 88, 90, and 92. Each of the terminal leads 88, 90, 92, has one or more conductors 94 mechanically and electrically connected to an associated one of the terminal lugs 82, 84, and 86. The terminal lugs may define holes 95 that receive the conductors 94 therein. The conductors 94 may be soldered or otherwise attached to the periphery of the holes 95.

Figure 3:
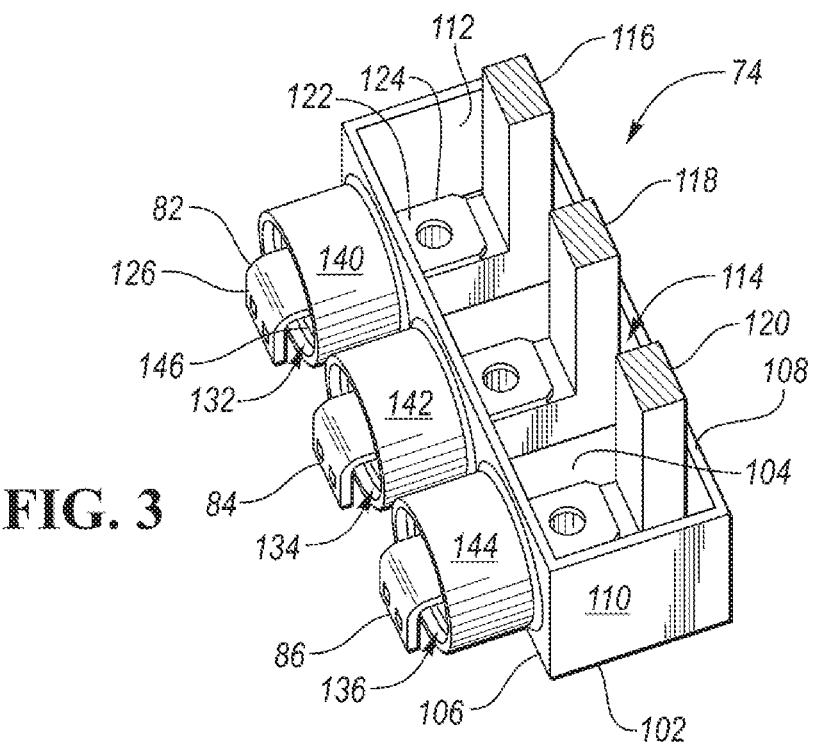
FIG. 3 is a schematic perspective view of a terminal block.

Referring to FIG. 3, the terminal block 74 includes a housing 102 with at least one sidewall. In the illustrated embodiment, the housing 102 includes a bottom wall 104, a front wall 106, a back wall 108, a sidewall 110, and another sidewall 112. The walls of the housing 102 cooperate to define a cavity 114. The transmission housing 80 may define an opening 81 that receives the terminal block 74 at least partially therein. The lower portion of the terminal block 74 is disposed within the interior of the transmission 12 and thus is in a wet environment. During operation of the vehicle, oil, e.g., transmission fluid, is splashed, sprayed, or otherwise contacts the terminal-block housing 102. The terminal block 74 is designed to have a dry cavity 114 despite being in the wet environment. As will be described in more detail below, the terminal block 74 includes a sealing system that prevents transmission fluid from entering into the cavity 114.

At least one conductor 116 is disposed in the terminal block 74. The illustrated terminal block 74 is for a three-phase electric machine and includes three conductors 116, 118, 120 each associated with one of the phases. The conductors may be supported on the bottom wall 104. Each of the conductors is configured to electrically connect with the inverter 56. The conductors 116, 118, 120 are associated with the terminal lugs 82, 84, 86 respectively. The terminal lug 82 includes a body 122 having a first end 124 disposed in the cavity 114 and attached to the conductor 116 and a second end 126 external to the cavity 114 and configured to attached to the terminal leads 88. The first end 124 may be attached to the conductor 116 by a fastener (not shown) that extends through an opening defined in the second end 124. The terminal lugs 84 and 86 may be similarly structured.

The terminal lug 82 extends through the front wall 106 and is in both the wet environment and the dry environment. A sealing system is used to prevent oil from entering into the dry cavity 114. The front wall 106 may define holes 132, 134, 136 that each receive an associated one of the terminal lugs. The terminal lugs include associated sealing members that prevent oil from flowing through the holes and into the dry cavity 114.

For example, three sealing collars 140, 142, 144, each associated with one of the terminal lugs, project from the front wall 106. The sealing collars may be annular and define an inner circumferential sealing surface 146. In this embodiment, the inner sealing surfaces 146 of the collars 140, 142, 144 defines the holes 132, 134, 136. The collars may be integrally formed with the front wall 106. The sealing members of the terminal lugs 82, 84, 86 are configured to sealingly engage with the inner sealing surfaces 146 to seal the cavity 114. The terminal block 72 may be the same or similar terminal block 74.

Figure 4:
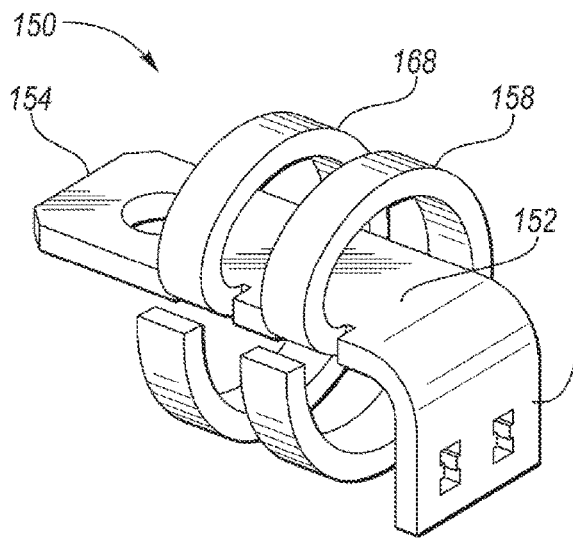
FIG. 4 is a perspective view of a terminal lug with sealing members not shown for illustrative purposes.
Figure 5:
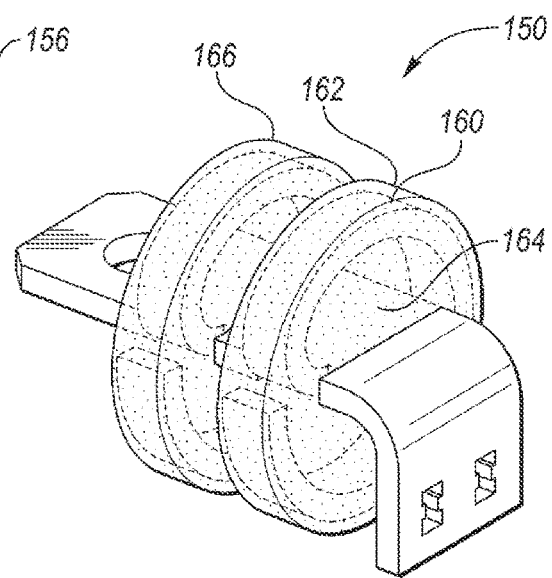
FIG. 5 is a perspective view of the terminal lug of FIG. 4 with the sealing members shown.

FIGS. 4 and 5 illustrates a terminal lug 150 that may be used with one or more of the terminal blocks 72 and 74. The terminal lug 150 including a body 152 having a first end 154 configured to attach a conductor of the terminal block 72 or 74 and a second end 156 configured to attach to a terminal lead(s) of the motor 18 or the generator 24. The terminal lug 150 includes at least one support 158 for at least one sealing member 160. The support 158 is disposed between the first and second ends 154, 156 so that the support 158 is disposed within the sealing collar, e.g., collar 140, or other portion of the terminal-block housing 102. The support 158 may be integrally formed with the body 152. For example, the terminal lug 150 may be made of electrically conductive metal, such as copper or aluminum, that is stamped and then formed into the shape shown in FIG. 4. The support 158 may encircle the body as shown. For example, the support 158 may be spiral shaped and wrap around the body 152 such that that body extends perpendicularly through a center of the spiral.

The sealing member 160 is disposed on the support 158. The sealing member 160 may be over-molded to the support 158. The sealing member may be formed of elastomer or other material that is capable of sealing over a large range of temperatures such as between −40 degrees Celsius (C) and 150 degrees C. The sealing member 160 may be disc shaped. The disc may include an outer circumferential sealing surface 162 configured to engage with the inner sealing surface 146 of an associated collar and a sealing face 164 that blocks the hole. The sealing member 160 also seals to the body 152 to prevent leakage at the interfaces between the sealing member 160 and the body 152.

In some embodiments, the terminal lug 150 may include a second sealing member 166 disposed on a second support 168. The second sealing member 166 and the second support 168 may be the same as the first set. The second sealing member 166 provides redundant leak protection and may help center the terminal lug 150 within the collar. The second support/sealing member may be axially spaced apart from the first support/sealing member.

Figure 6:
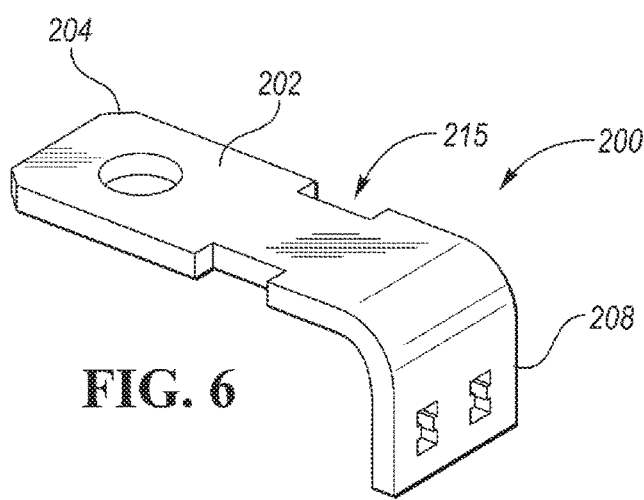
FIG. 6 is a perspective view of another terminal lug.
Figure 7:
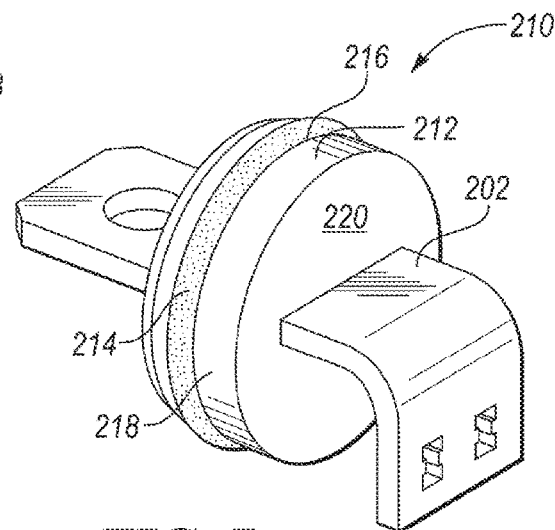
FIG. 7 is a perspective view of the terminal lug of FIG. 6 with a sealing assembly attached thereto.

FIGS. 6 and 7 illustrate another terminal lug 200 that may be used with the terminal block 72 or 74. The terminal lug 200 includes a body 202 having a first end 204 configured to attach to a conductor of the terminal block 72 or 74 and a second end 208 configured to attached to a terminal lead(s) of the motor 18 or the generator 24. The terminal lug 200 includes an associated sealing assembly 210 that seals the hole of the terminal block. The sealing assembly 210 may include a support 212 and a sealing member 214. Unlike the support 158, the support 212 may be separate from the terminal lug 200. The support 212 may be an annular plug that attaches to a notch 215 defined by the body 202. The support 212 is configured to seal with the body 202. The support 212 may be plastic, and may be over-molded to the terminal lug 200. The support 212 may define a groove 216 that receives the sealing member 214. The groove 216 may be recessed into an outer circumferential surface 218 of the plug 212. The sealing member 214 may be an O-ring or gasket that is formed of rubber or other suitable material.

The sealing assembly 210 is configured to be sealingly disposed within the collar or similar structure of the terminal-block housing. A diameter of the outer circumferential surface 218 may approximate the diameter of the inner circumferential surface of the housing. The sealing member 214 is compressible and is configured to sealingly engage with the inner circumferential surface to prevent transmission fluid from flowing into the dry cavity of the terminal block. The support 212 includes a front face 220 that seals the hole of the terminal-block housing.

The sealing terminal lugs and cooperating terminal-block housing cooperate to maintain a wet/dry interface at the terminal block. This allows for the terminal block to be at least partially disposed in a wet environment such as a transmission housing. This design provides a cost-effective solution that is serviceable without requiring complex resealing of the terminal block following disassembly. Another benefit is easier assembly and disassembly due to the terminal lugs being easily inserted/removed from the terminal-block housing.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A terminal block comprising:
   a housing including sidewalls defining a cavity, wherein one of the sidewalls defines a hole opening into the cavity;
   a conductor supported in the cavity and configured to electrically connect with an inverter;
   a terminal lug extending through the hole, the terminal lug including a body having a first end disposed in the cavity and attached to the conductor and a second end external to the cavity and configured to attach to a terminal lead of an electric machine, the terminal lug further including a support integrally formed with the body and disposed between the first and second ends to be located within the hole; and
   a sealing member attached to the support and in sealing engagement with the hole to prevent fluid from entering the cavity.

2. The terminal block of claim 1, wherein the support encircles the body.

3. The terminal block of claim 1, wherein the support is spiral shaped.

4. The terminal block of claim 3, wherein the hole and the sealing member are circular.

5. The terminal block of claim 1, wherein sealing member is over-molded to the support.

6. The terminal block of claim 1, wherein the terminal lug further includes a second support integrally formed with the body and disposed between the first and second ends to be located within the hole, and further comprising a second sealing member attached to the second support and in sealing engagement with the hole.

7. The terminal block of claim 6, wherein the support and the second support are spaced apart from each other in an axial direction of the body.

8. The terminal block of claim 1, wherein the sidewall defines a second hole opening into the cavity, and further comprising a second terminal lug extending through the second hole, the second terminal lug including a second body having a first end disposed in the cavity and attached to a second conductor and a second end external to the cavity and configured to attached to an additional terminal lead of the electric machine, the second terminal lug further including a second support integrally formed with the second body and disposed between the first and second ends of the second body to be located within the second hole; and
   a second sealing member attached to the second support and in sealing engagement with the second hole.

9. The terminal block of claim 8, wherein each of the support and the second support are spiral shaped.

10. A terminal block comprising:
    a housing defining a hole;
    a conductor supported in the housing and electrically connectable with an inverter;
    a terminal lug extending through the hole and including a first end attached to the conductor and a second end attachable to a terminal lead of an electric machine; and
    a sealing member attached to the terminal lug and in sealing engagement with the hole to prevent fluid from entering the housing, wherein the terminal lug further includes a support and the sealing member is seated on the support.

11. The terminal block of claim 10, wherein the support is an integrally formed portion of the terminal lug.

12. The terminal block of claim 11, wherein the sealing member is over-molded to the support.

13. The terminal block of claim 11, wherein the support is spiral shaped, the hole is circular, and the sealing member is disk shaped.

14. The terminal block of claim 10, wherein the support is a plug received on the terminal lug and defining a groove, and the sealing member is disposed in the groove.

15. The terminal block of claim 14, wherein the terminal lug defines a notch, and the plug is disposed in the notch.

16. The terminal block of claim 10, wherein the second end defines an opening configured to receive the terminal lead therein.

17. The terminal block of claim 10, wherein the sealing member is elastomer over-molded to the terminal lug.

18. A terminal block comprising:
    a housing including walls defining a cavity, wherein one of the walls defines a hole opening into the cavity;
    a conductor supported in the cavity and configured to electrically connect with an inverter;
    a terminal lug extending through the hole, the terminal lug including a body having a first end disposed in the cavity and attached to the conductor, a second end external to the cavity and configured to attached to a terminal lead of an electric machine, and a notch defined in the body between the first and second ends; and
    a sealing assembly including a support attached to the terminal lug at the notch and a sealing member seated on the support and in sealing engagement with the hole to prevent fluid from entering the cavity.

19. The terminal block of claim 18, wherein the support is an annular plug and the sealing member is an o-ring.

\* \* \* \* \*